United States Patent
Curran

[11] 3,762,685
[45] Oct. 2, 1973

[54] STEM GUIDED VALVE WITH CAGE ASSEMBLY

[75] Inventor: John R. Curran, Attleboro, Mass.

[73] Assignee: The Foxboro Company, Foxboro, Mass.

[22] Filed: Dec. 9, 1971

[21] Appl. No.: 206,251

Related U.S. Application Data

[63] Continuation of Ser. No. 421,426, June 1, 1970.

[52] U.S. Cl. .............................. 251/362, 137/454.6
[51] Int. Cl. ............................................. F16k 51/00
[58] Field of Search ................... 251/362, 361, 360, 251/363, 355; 137/454.5, 454.6

[56] References Cited
UNITED STATES PATENTS

| | | | |
|---|---|---|---|
| 1,814,762 | 7/1931 | Mochel | 251/361 |
| 3,506,242 | 4/1970 | Aunspach | 251/361 |
| 1,991,974 | 2/1935 | Broecker | 251/363 X |
| 2,692,750 | 10/1954 | Davis, Jr. et al. | 251/362 X |
| 3,487,435 | 12/1969 | Sheardown | 137/454.6 |
| 3,398,964 | 8/1968 | Trefil | 251/355 X |
| 3,521,667 | 7/1970 | Johnson | 251/363 X |
| 2,069,297 | 7/1937 | Abercrombie et al. | 251/363 X |
| 2,845,085 | 7/1958 | Robbins | 251/363 X |
| 3,089,509 | 5/1963 | Collins | 137/454.6 |
| 3,298,389 | 1/1967 | Freeman | 137/454.6 |
| 3,548,874 | 12/1970 | Parks | 251/362 X |

*Primary Examiner*—Samuel Scott
*Attorney*—Lawrence H. Poeton

[57] ABSTRACT

An industrial process contoured plug valve structure wherein guidance for the stem of the valve plug is provided by a central bearing surface contained within a valve cage provided for ease of assembly and replacement of the seat ring.

3 Claims, 4 Drawing Figures

STEM GUIDED VALVE WITH CAGE ASSEMBLY

CROSS REFERENCE TO RELATED APPLICATION:

This is a continuation of application Ser. No. 42,426, filed June 1, 1970.

BACKGROUND OF THE INVENTION

1. Field of the Invention

This invention relates to valves used in industrial processes and has particular reference to the valve stem assemblies of such valves. Specifically this invention relates to the valve stem structures of the so-called "Stem-guided" and "Cage-guided" valves.

2. Description of the Prior Art

There are many different kinds of process flows to be controlled with valves and ordinarily it is necessary to provide specialized valve structures for each of the different applications.

One such structure is the conventional contoured valve plug. A typical problem with this structure is the necessity of providing an undesirably large valve bonnet having precision machined surfaces.

The large bonnet is required to provide support and guidance for the stem and plug assembly.

Another drawback to this arrangement, especially in unbalanced valves, is the ability of the process fluid to collect in the open areas within the bonnet. This collected fluid may provide unwanted dashpot effects, may contaminate subsequent flows or may even polymerize causing the valve to fail.

Another typical drawback to a plug valve is that the valve seat rings are usually very difficult to replace even though they commonly have to be replaced often due to wear. Normally seat rings are secured to the valve body by restraints in the body such as clip rings or by threading the seat into the valve body.

A conventional solution to the replacement of seat rings problem is the cage type valve. Conventionally, a seat ring is placed in the valve body on a lip or shoulder, a hollow cylindrical cage is placed on it and the plug is modified to be guided by and seal against the inside surface of the cage. The valving action occurs between the plug and cage, but all the aforementioned components are held in place by compression against the shoulder applied by the bonnet. Once the bonnet is removed, the seat ring may be easily replaced without further diassembly.

In a cage valve stem guidance is provided by the contact between the inner surfaces of the cage and the sides of the plug. This results in a galling problem due to the friction between the cage and the plug. The cage must be metal to support the compressive loads. It is impractical to line the inside of the cage or the plug with a plastic or other low friction insert because of contamination or erosion by the fluid itself.

SUMMARY OF THE INVENTION

In order to solve the difficulties enumerated above, a valve was designed utilizing a cage structure that provides guidance to the stem, not the plug. It is a hybrid between cage and stem guided valves in that it allows for cage assembly and plug and seat valving. A further advantage is that the size of the bonnet may be reduced and the high tolerance machined surfaces eliminated because the guidance is provided by the cage within the body of the valve.

Another major advantage of this design is that the bodies and bonnets of this type of stem guided valve are interchangeable with the bodies and bonnets of a more conventional design cage valve. This interchangeability allows a cage valve of this design to be converted to a stem guided valve after it is mounted in the field. This design also allows the utilization of a thicker stem than possible in a conventional cage valve.

DESCRIPTION OF THE PREFERRED EMBODIMENT

Figure 1:
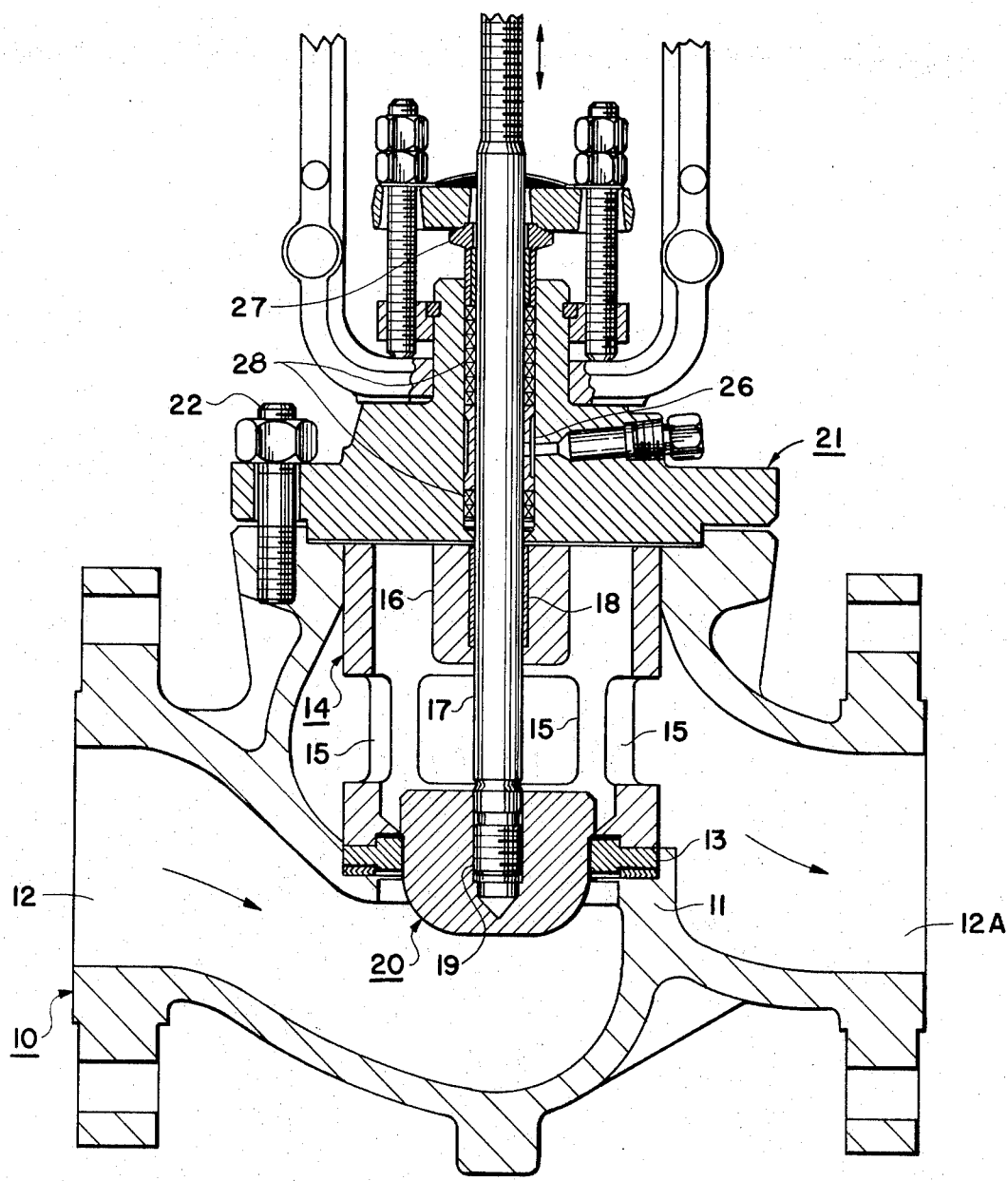
FIG. 1 is a vertical central section of a stem guided plug valve with cage assembly.

Referring now to FIG. 1, the valve body 10 is provided with a shoulder 11 separating the inlet and the outlet flow passageways 12 and 12A. Seat ring assembly 13 rests upon shoulder 11. Positioned concentrically with and directly above seat ring assembly 13 is the cage 14 which contains openings 15 communicating with passageway 12A.

Cage 14 further contains a central support section 16 through which the valve stem 17 is inserted. The contacting surface of central support section 16 is bearing surface 18 which encircles and guides the stem 17. This area is described in greater detail with regard to FIG. 3.

One end of stem 17 has a threaded section 19 which is secured into a matching threaded section of the contoured valve plug 20.

The cage and seat ring assemblies are held in position by compression against the valve body by the valve bonnet assembly 21, which is secured to the valve body 10 by stud assemblies, one of which is shown, stud 22.

Lantern ring assembly 26 and packing 28 are provided for lubrication of the stem and prevention of contamination but do not provide significant support or guidance to stem 17. Guidance at the top of the valve is provided by bushing 27.

Stem 17 is moved in a vertical direction by a valve actuator, not shown. In the fully closed or no flow position shown in FIG. 1, valve stem 17 is urged downward by the actuator and it is guided by the bearing surface 18 so that plug 19 fits securely into the central opening of the seat ring assembly 13 thereby blocking flow.

In the open or full flow position, not shown, stem 17 would be lifted by the actuator until plug 20 was removed from the central opening of the seat ring assembly 13. This would allow the flow of fluid between inlet passageway 12 through the central opening of seat ring assembly 13 into the hollow central section of cage 14. The fluid would flow from cage 14 through the openings 15 into the outlet fluid passageway 12A. Of course, the position of the stem may be varied between the extremes described to provide regulation of the fluid flow.

Figure 2A:
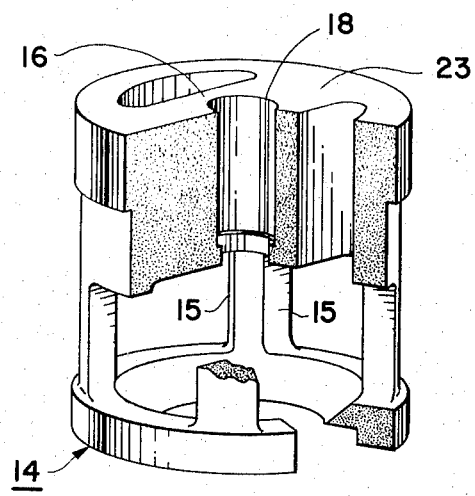
FIGS. 2A and 2B show a partial section and a top view of a stem guiding cage.
Figure 2B:
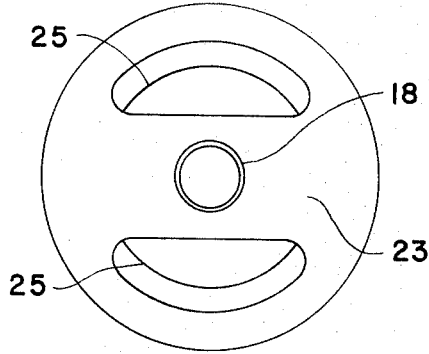

As shown in FIGS. 2A and 2B the central support section of cage 14 in FIG. 1 is mechanically positioned coaxial to cage 14 by the metal webs 23 which can conveniently be an integral part of the cage. Port 25 allows any fluid that collects above the plug to freely communicate with the process fluid whereby the dashpot effects hereinbefore described are avoided.

Figure 3:
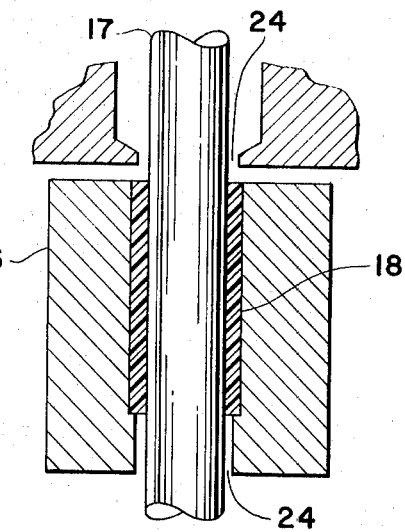
FIG. 3 is an enlarged view of the area surrounding the guiding surface.

FIG. 3 is an enlargement of the area surrounding bearing surface 18. A clearance is provided in support section 16 into which a low friction bearing surface cylinder is inserted. The stem 17 is in contact with surface 18 and is guided by it but stem does not contact the surround support 16 or the bonnet 21. Clearance 24 is typically one half of the thickness of the bearing surface and is provided between the stem 17 and support 16 and between stem 17 and bonnet 21 for this purpose. It is only necessary that the clearance is small enough to prevent displacement of surface 18 as stem 17 is actuated.

The disclosure of this application presents a preferred embodiment of the invention and is intended only to illustrate the invention, it being recognized that various modifications and equivalents will occur to those skilled in the art, and accordingly the scope of the invention covered hereby is not to be considered limited except as required by the prior art.

I claim:

1. An improved flow control valve of the type having;
   a valve body including an interior passageway for flow of fluid, said body including a support shoulder,
   a valve seat ring resting on said shoulder having an inner seating surface surrounding said passageway,
   a hollow cylindrical valve cage in said body resting on said seat ring, the interior walls of said cage having a diameter larger than the diameter of said inner seating surface,
   a valve plug mounted for motion in said cage having an external diameter larger than said inner seating surface of said ring so that said plug may be moved toward said ring to block said interior passage, the external diameter of said plug being sufficiently smaller than the diameter of the interior walls of the cage to avoid contact therewith,
   a valve stem in said cage having an external diameter significantly smaller than said plug for moving said plug, and
   a valve bonnet mounted against said body to secure said cage and seat ring by compression, wherein the improvement comprises:
   a stem guide surface mounted concentric with and supported by and disposed radially inward from the internal walls of the cage, said surface being in contact with the external surface of said stem to allow motion of the stem only along the axis of the cage.

2. A valve as claimed in claim 1 wherein said stem guide surface is a cylinder of low friction material.

3. A valve as claimed in claim 2 comprising:
   a central support section attached to the interior walls of the cage, said support section containing a recessed area surrounding said stem within said stem guide surface is restrained.

* * * * *